US008643495B2

(12) United States Patent
Lan et al.

(10) Patent No.: US 8,643,495 B2
(45) Date of Patent: Feb. 4, 2014

(54) INTERNET OF THINGS BASED FARM GREENHOUSE MONITOR AND ALARM MANAGEMENT SYSTEM

(75) Inventors: Zehua Lan, Beijing (CN); Lixia Ma, Beijing (CN)

(73) Assignee: Zehua Lan, Beijing (CN)

( * ) Notice: Subject to any disclaimer, the term of this patent is extended or adjusted under 35 U.S.C. 154(b) by 162 days.

(21) Appl. No.: 13/343,751

(22) Filed: Jan. 5, 2012

(65) Prior Publication Data

US 2013/0093592 A1   Apr. 18, 2013

(30) Foreign Application Priority Data

Oct. 14, 2011 (CN) .......................... 2011 1 0311645

(51) Int. Cl.
*G08B 21/00* (2006.01)
(52) U.S. Cl.
USPC ............................ 340/602; 340/584; 340/12.1
(58) Field of Classification Search
USPC .......... 340/602, 584, 601, 12.1, 12.15, 12.22, 340/531, 517, 521
See application file for complete search history.

(56) References Cited

U.S. PATENT DOCUMENTS

| | | | | |
|---|---|---|---|---|
| 4,306,542 | A * | 12/1981 | Reinert | 126/630 |
| 6,098,893 | A * | 8/2000 | Berglund et al. | 236/51 |
| 7,580,808 | B2 * | 8/2009 | Bos | 702/127 |
| 7,702,462 | B2 * | 4/2010 | Fuessley et al. | 702/2 |
| 2005/0172530 | A1 * | 8/2005 | Huffman | 40/645 |
| 2009/0121026 | A1 * | 5/2009 | Druker et al. | 235/462.44 |

* cited by examiner

*Primary Examiner* — Daniel Previl
(74) *Attorney, Agent, or Firm* — Alan Kamrath; Kamrath IP Lawfirm, P.A.

(57) ABSTRACT

A farm greenhouse monitor and alarm management system based on the Internet of things with real-time monitoring environmental parameters, which is aimed at monitoring and managing the growth of crops in the farm greenhouse, includes mobile inspection devices, data acquisition units, data receiving devices, REID devices and data storage servers. The system can automatically collect greenhouse environmental parameters such as air temperature, air humidity, illumination, soil temperature and soil moisture, etc. and also can automatically judge the critical value of every parameter and alarm. It utilizes ZigBee chip integrated wireless sensors and data collecting modules. This system provides inspection devices, which lowers the requirements for practitioners and reduces the cost of automatic management of the farm greenhouse.

10 Claims, 9 Drawing Sheets

INTERNET OF THINGS BASED FARM GREENHOUSE MONITOR AND ALARM MANAGEMENT SYSTEM

BACKGROUND OF THE INVENTION

1. Field of the Invention

This invention involves an internet of things based farm greenhouse monitor and alarm management system that can monitor environmental parameters in real time, to automatically alarm practitioners according to real-time environmental parameters and alarm time set by users, and also to automatically broadcast voice information by inspection terminals.

2. Description of the Related Art

As a foundation closely related to national economies, agriculture plays a significant role to a nation who holds a large population but is still a developing country. Currently, the farm greenhouses are managed mainly through manual inspection, whose efficiency is critically low. For example, if a practitioner wants to get the greenhouse's data, such as air temperature and humidity, illumination, soil temperature, soil moisture, content of inorganic elements in soil, etc., he himself must check the thermometer, humidity indicator or other devices. Actually, farmers usually manage their greenhouses based mainly on their previous experiences, affecting easy management of the greenhouse. The crop automatic management systems now available generally are provided to farmers as a kind of an intelligent system with integrated services, such as measuring, configuring, operating and fertilizing, thus achieving the scientific management of agricultural fertilization in a way. However, these intelligent systems are large in volume and very expensive on the one hand. On the other hand, they have no features to manage batches of crops and cannot provide alarm functions. Therefore, it is difficult for those systems to popularize in greenhouse management.

Although there exists some small greenhouse fertilizing and watering systems, they are isolated and closed and are limited to a confined area of the greenhouse. If a practitioner wants to check or monitor some environmental parameters, he will have to get into the greenhouse and operate the computer inside on the spot. Once leaving, he cannot get real-time information inside. In a word, there is lack of an intelligent system that allows practitioners to monitor the growth of crops inside and their living environment. Moreover, data collecting units and processing units in those systems available currently are usually connected by a line, thus largely reducing the flexibility of the system deployment. Also, if too many lines exist, there is a trouble in how to wire them.

The present invention is, therefore, intended to obviate or at least alleviate the problems encountered in the prior art.

SUMMARY OF THE INVENTION

In response to these problems, this invention involves an internet of things based farm greenhouse monitor and alarm management system that can collect data, such as soil temperature and humidity, air temperature and humidity, in real time and can judge automatically whether to fertilize and water batches of crops in the greenhouse, and can judge whether their living environment is suitable. If fertilizer and water are needed or some living factors are beyond an appropriate range, the system will alarm practitioners in a default way, whether by playing a piece of alarm music or sending alarm messages automatically. In addition, the system allows users to set a fixed time-point, which is determined through previous experiences. Once upon arrival at that point in time, it will alarm in a default way set by users, thus achieving automatic management of crops and flowers inside the farm greenhouse. Meanwhile, all the data that the system can collect and manage will be stored in the Internet, where practitioners can access needed information through computers or intelligent mobile phones whenever and wherever possible. Furthermore, mobile terminals are available for practitioners making route inspections to get voice broadcast services. Taking mobile inspection devices outside the greenhouse will automatically broadcast voice information about the growth of crops in the nearest greenhouse according to signals received, to determine whether the practitioner should get into the greenhouse. Depending on those mobile inspection devices, practitioners have no need to get inside to grasp the growth of crops. The system features intelligence, easiness to operate, flexibility to deploy, and low cost and power.

The technique scheme this invention takes is that the internet of things based farm greenhouse monitor and alarm management system includes at least one data processing device, which can be a personal computer or a server, and is used to process data coming from receiving devices such as temperature, humidity, illumination, soil temperature and moisture, etc. Having processed the data, the device will illustrate the results in a friendly way, such as text messages, graphs, etc. and also judge automatically whether alarming conditions are met. If so, it will provide to users alarming information, for example, voice alarms, text message alarms, e-mail alarms, log alarms, etc. Furthermore, all the data collected will be used to generate daily and monthly reports. The data processing device connects with the Internet and has a user interface for practitioners to access. The data receiving devices are used to transfer data such as soil temperature and moisture, and air temperature and humidity collected by data collecting units, and then send the data to the data processing device through serial ports. Data collecting units, including air temperature and humidity sensors and soil sensors, are used to collect crops' living environmental parameters in real-time and to send the data to the data processing device through ZigBee wireless networks. A RFID device, also called an electronic tag, is used to identify a certain greenhouse. Mobile inspection devices can read tag information from it.

The internet of things based farm greenhouse monitor and alarm management system also includes a terminal device used to display all kinds of environmental factors inside the greenhouse. Once the environment is not suitable for crops, the terminal will play a piece of music as an alarm. The device is mainly used in greenhouses of large areas to be convenient for practitioners to grasp real-time environmental parameters. While in small greenhouses and in order to reduce cost, there exists no terminals, so that practitioners need to obtain environmental parameters directly from the data processing device.

The internet of things based farm greenhouse monitor and alarm management system also includes a mobile inspection device having a tag reading module used to read electronic tags on RFID devices inside the greenhouse to identify a unique one. A wireless communication module is available in the device. It requests real-time parameters to the data processing device through wireless networks. There is also a voice broadcast module informing practitioners of the data of a greenhouse and related suggestions in the form of a voice broadcast.

The internet of things based farm greenhouse monitor and alarm management system integrates a data processing device, receiving devices and mobile devices into a multifunctional mobile inspection device, including a data receiving unit, a RFID reading module, storage units, a data processing unit, a communication module, an input/output module and a power supply. The RFID reading module reads a tag on RFID devices in the nearest greenhouse to identify a unique one. The data receiving unit sends requests for data to receiving devices inside, which send requested environmental parameters back. On receiving the data, the receiving unit transfers it to the processing unit, which will save the data into storage units and will judge whether to alarm. The data processing unit will upload regularly all the data to data storage servers in the Internet through a communication module. The input/output module is used by users to configure the system or to check some related information. The whole device is powered by the power supply.

The processing of manipulating the farm greenhouse monitor and alarm management system is as follows.

1. The data collecting unit collects environmental parameters such as temperature, humidity, illumination, soil temperature and soil moisture, etc in real time.

2. The data receiving device obtains data regularly from the collecting unit and transfers it to the processing devices.

3. The data processing device processes the data received and stores it into databases to make it available for later analysis and display.

4. The data processing device analyzes these environmental parameters. If any of them reaches an alarming value that is set before hand, it will activate an alarm function and will make some suggestions.

5. The data processing device is connected to the Internet and provides a graphic user interface, through which users can manage the system and can monitor the growth of crops and their living environmental factors in real time.

6. Remote computers can be used by practitioners through the Internet to access the data processing devices, manage the system, or monitor the greenhouse.

7. Practitioners can also use intelligent mobile phones or other mobile terminals connected to the data processing devices through communication networks to manage the system.

8. When practitioners carrying mobile inspection devices with them are making inspections around greenhouses, those devices automatically broadcast voice information about the nearest greenhouse and further suggestions to them.

The result of using this system to manage greenhouses is remarkable. Data such as soil temperature and moisture, illumination, air temperature and humidity and content of nutrition in soil can be available through internet of things. Grasping those parameters timely and regulating some detrimental factors based on the data are needed to ensure the crops are living in a suitable environment to improve the quantity and quality of crops. Thus, the system makes it possible to scientifically predict in agriculture, helps farmers improve their synthetical income, and lowers both the cost of automatic management of greenhouses and requirements for farmers to participate in modern agriculture. Modern agriculture will be standardized, digitalized and networked.

Other objects, advantages, and new features of the present invention will become apparent from the following detailed description of the invention when considered in conjunction with the accompanied drawings.

DETAILED DESCRIPTION OF THE PREFERRED EMBODIMENTS

Embodiment One

The functions of the system in this invention mainly include: (1) collecting environmental parameters such as air temperature and humidity, illumination, soil temperature and moisture, etc. in real time; (2) alarming practitioners automatically according to the data collected with pre-set types and conditions of alarm; (3) crop information management; (4) user management; and (5) management of sensor nodes and other hardware.

Figure 1:
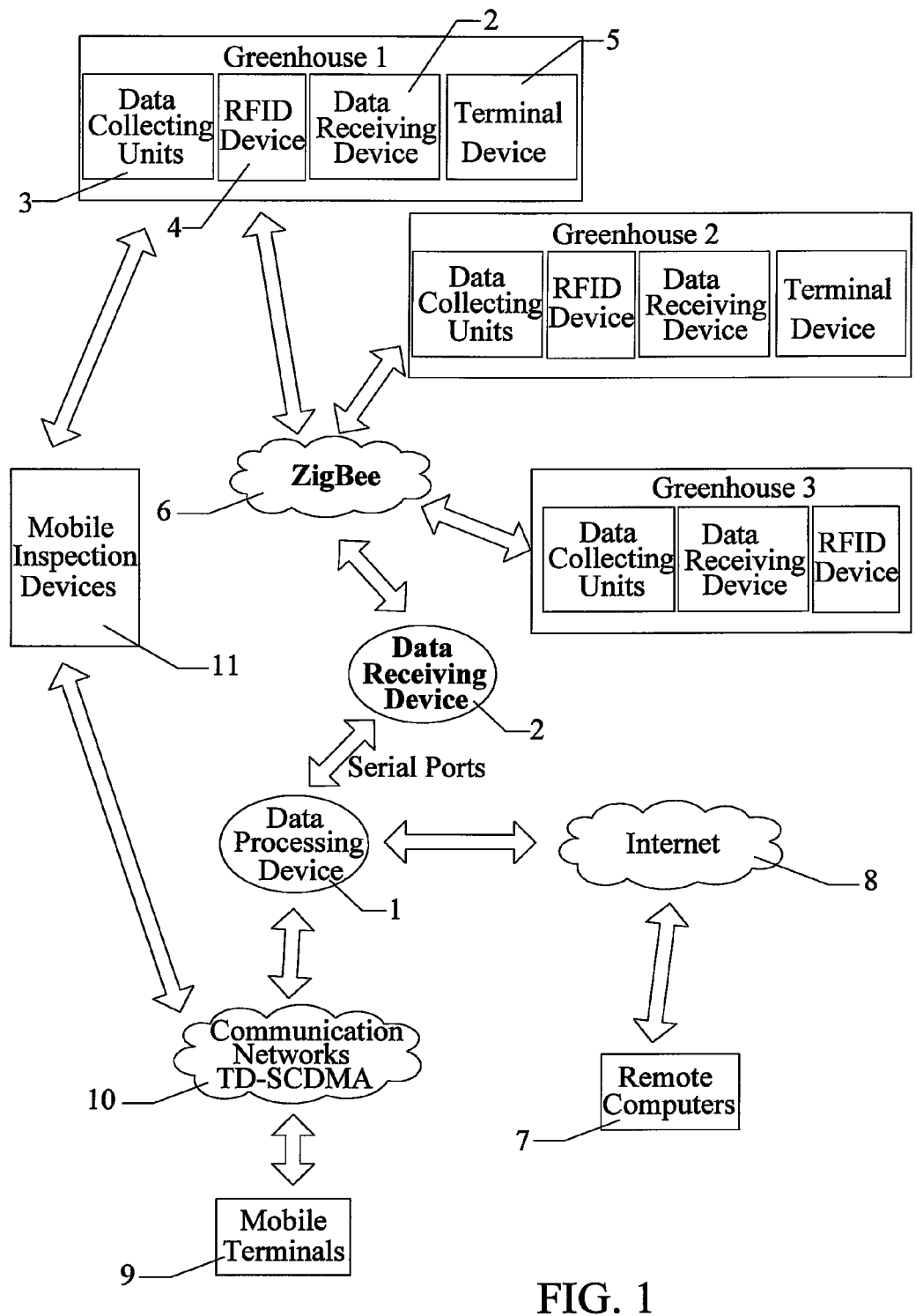
FIG. 1 illustrates the overall architecture of the internet of things based monitor and alarm management system in embodiment one.

FIG. 1 illustrates the overall architecture of this invention in embodiment one. In this figure, the internet of things based farm greenhouse monitor and alarm management system includes a data processing device 1, a data receiving device 2, data collecting units 3, a RFID device 4, terminal devices 5, ZigBee networks 6, remote computers 7, the Internet 8, mobile terminals 9, communication networks 10, and mobile inspection devices 11. The data collecting units 3 collect environmental parameters in real-time and send them to data receiving devices 2 through ZigBee networks 6. The data receiving device 2 regularly transfers the environmental parameters obtained to the data processing device 1, which, having received the data, stores it into databases and judges whether to send an alarm according to alarm conditions set in advance. Serial or USB ports are utilized to connect the data receiving device 2 and the data processing device 1. The data processing device 1 is connected to the Internet 8 and provides a user interface, through which the remote computer 7 can monitor the growth of crops inside greenhouses or can manage the system in real-time over the Internet 8. The mobile terminal 9 can access the user interface provided by the data processing device 1 over communication network TD-SCDMA 10, can monitor the growth of crops inside greenhouses or can manage the system in real-time. The mobile inspection device 11 can read electronic tags on the RFID device 4 to identify a unique greenhouse and can connect to the data processing devices 1 over the communication network TD-SCDMA 10. It will query infatuation about the greenhouse and will broadcast it to practitioners in the form of voice. The terminal device 5 placed inside a larger greenhouse can process the data of environmental parameters transferred by the data receiving device 2 and can judge whether the current environment is suitable for crops' growth, and if not, it will play a piece of music as an alarm, which is convenient for practitioners to keep abreast of the greenhouse environment parameters in real time.

Figure 2:
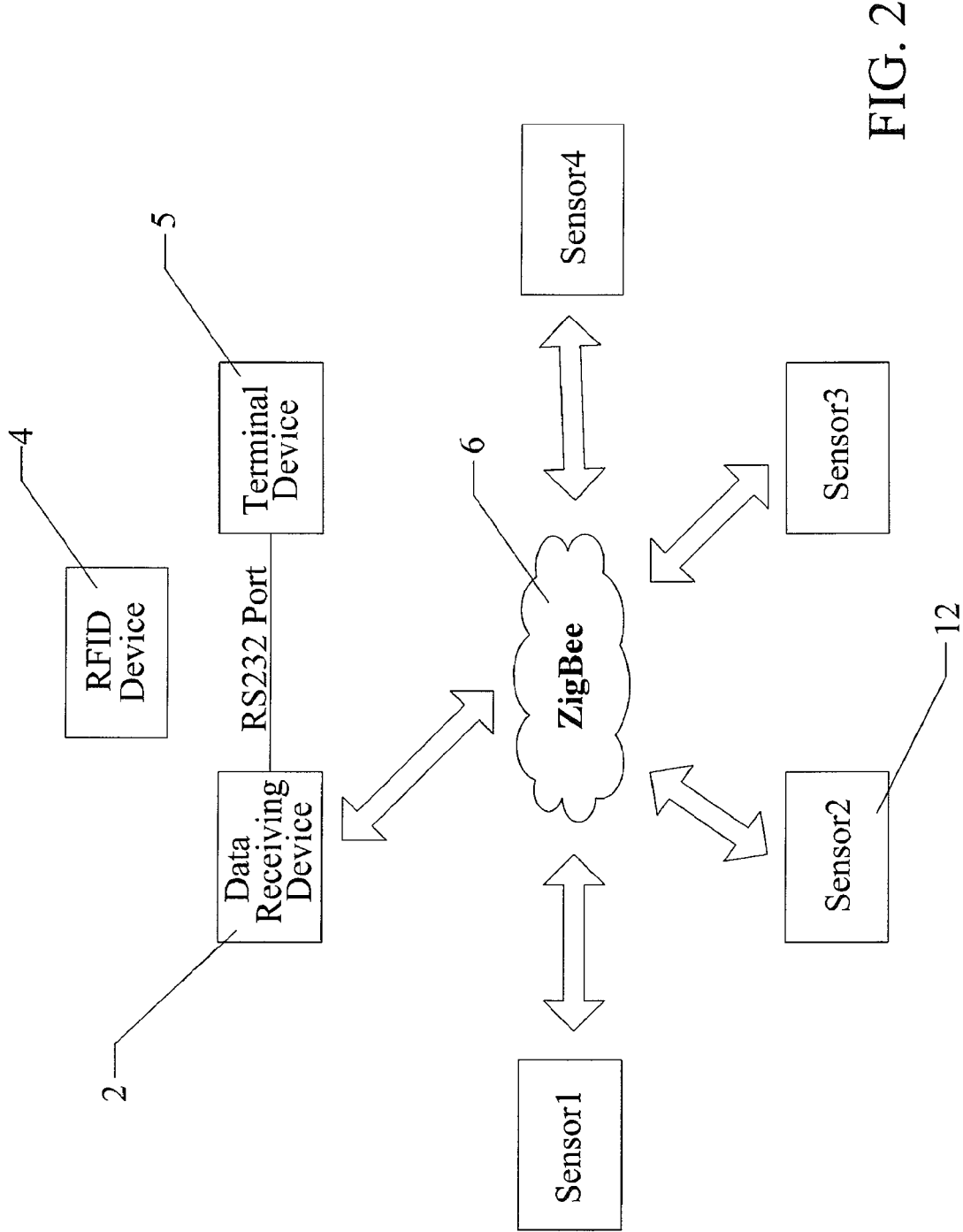
FIG. 2 illustrates the structure of the devices inside greenhouses in embodiments one, two and three.

FIG. 2 illustrates the structure of devices inside greenhouses. Those devices include the data receiving device 2, the RFID device 4, the terminal device 5 and sensors 12. Multiple sensors 12 constitute a data collecting unit. Those sensors 12 collect environmental parameters (air temperature and humidity, illumination, soil temperature and moisture, etc.) in real time and send them to the data receiving device 2 over the ZigBee network 6. The data receiving device 2 connects to the terminal device 5 through the RS232 port, while the latter terminal device 5 analyzes those environmental parameters and judges whether the current environment is suitable for a crops' growth. The RFID device 4 uniquely identifies a greenhouse, and the information it saves can be read by practitioners' mobile inspection devices 11.

Figure 3:
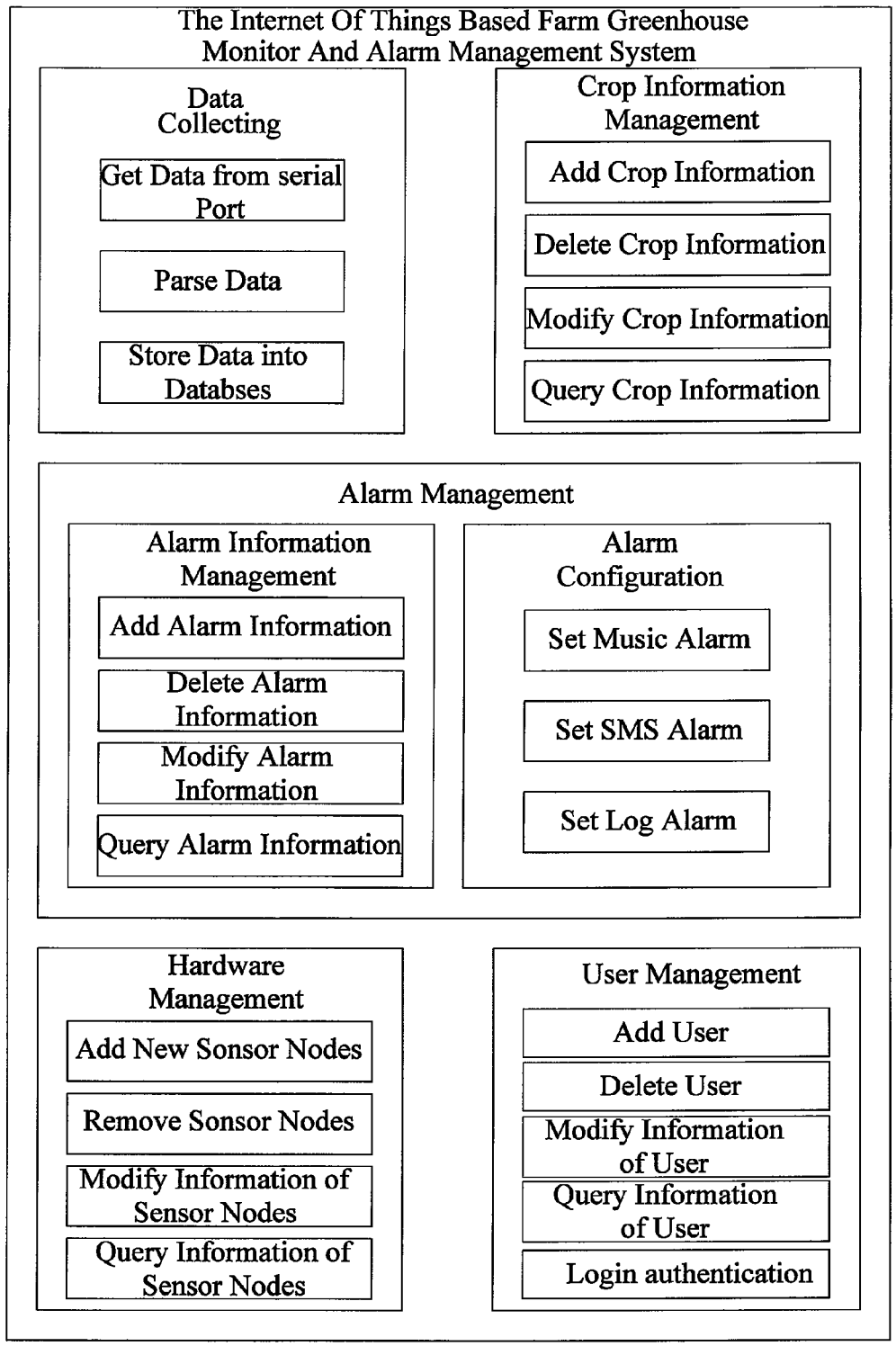
FIG. 3 illustrates the functions of the internet of things based monitor and alarm management system in embodiments one, two, three, four and five.

FIG. 3 illustrates the functions of the internet of things based farm greenhouse monitor and alarm management system involved in this invention. Those functions of the system are as follows.

Data collecting: the data collecting module collects environmental parameters in real time and stores them into corresponding tables in the database every specified time interval, which can be set by users. This module can automatically recognize and is adapted to certain hardware ports and can run long stably.

Crop Information Management: the crop information includes the serial number of certain crops, name, location, time of fertilization, flowering period, fruit period, optimal growth temperature, the amount of fertilizer and crop characteristics. Managing the information covers adding, deleting, modifying and querying the crop information.

Alarm management: the alarm management is mainly divided into two parts, one is an alarm information management, and the other is the alarm configuration. Alarm information management contains adding, deleting, modifying and querying alarm information. Alarm configuration allows users to set the alarm mode, and there are two main ways: a music alarm and an SMS alarm. The music alarm is playing a piece of music to prompt users that the current environment is not suitable for the growth of certain crops living inside while the SMS alert sends text messages over fetion (a SMS service provider) to notify the user. In addition, there is a default log alarm, which means the alarm logs will be automatically stored in the system log, where users can view the alarm information.

Hardware management: by the hardware management module users can access status information of various sensor nodes such as whether a sensor node is in normal working condition, the adequacy of power supplies, the type of sensors, etc. The management of hardware information covers adding new sensor nodes, removing sensor nodes, and modifying information of a sensor node.

User Management: the user management module is responsible for managing user information, and providing users a login interface, and its key features include adding, deleting, modifying and querying user information, and a login interface that allows users to log in and use the system.

Data collecting units 3 in the system through sensors 12 automatically collect environmental parameters such as air temperature and humidity, illumination, soil temperature and moisture, etc. in real time and transfer them to data receiving devices 2, which will regularly send the parameters to the data processing devices 1. The data processing devices 1 store the data into databases and compare it with the threshold value set before hand to judge whether an alarm condition is met. In larger greenhouses, practitioners can monitor environmental parameters in real time by the user interface using terminal devices 5 inside connected to data processing devices 1 or operating directly on data processing devices 1, while in smaller ones, it is usually the latter case. Remote users can also monitor greenhouses or can manage and maintain the system by using any computer that can access the Internet 8 over which it is connected to data processing devices 1. Meanwhile, mobile devices are available for remote users to do the same management over communication networks 10. Practitioners, taking with them the mobile inspection devices 11 the system provides, make inspections around greenhouses, and those mobile inspections devices 11 will automatically check the crop living environmental factors of the nearest greenhouse, will broadcast to practitioners and will give some suggestions.

Embodiment Two

The ZigBee technique is available for communications in a shot distance. Therefore, the host computers responsible for collecting data have to be placed near to sensors 12 in extremely larger greenhouses. If the host computers need to be placed far away from the greenhouse, the architecture in FIG. 4 is suitable.

Figure 4:
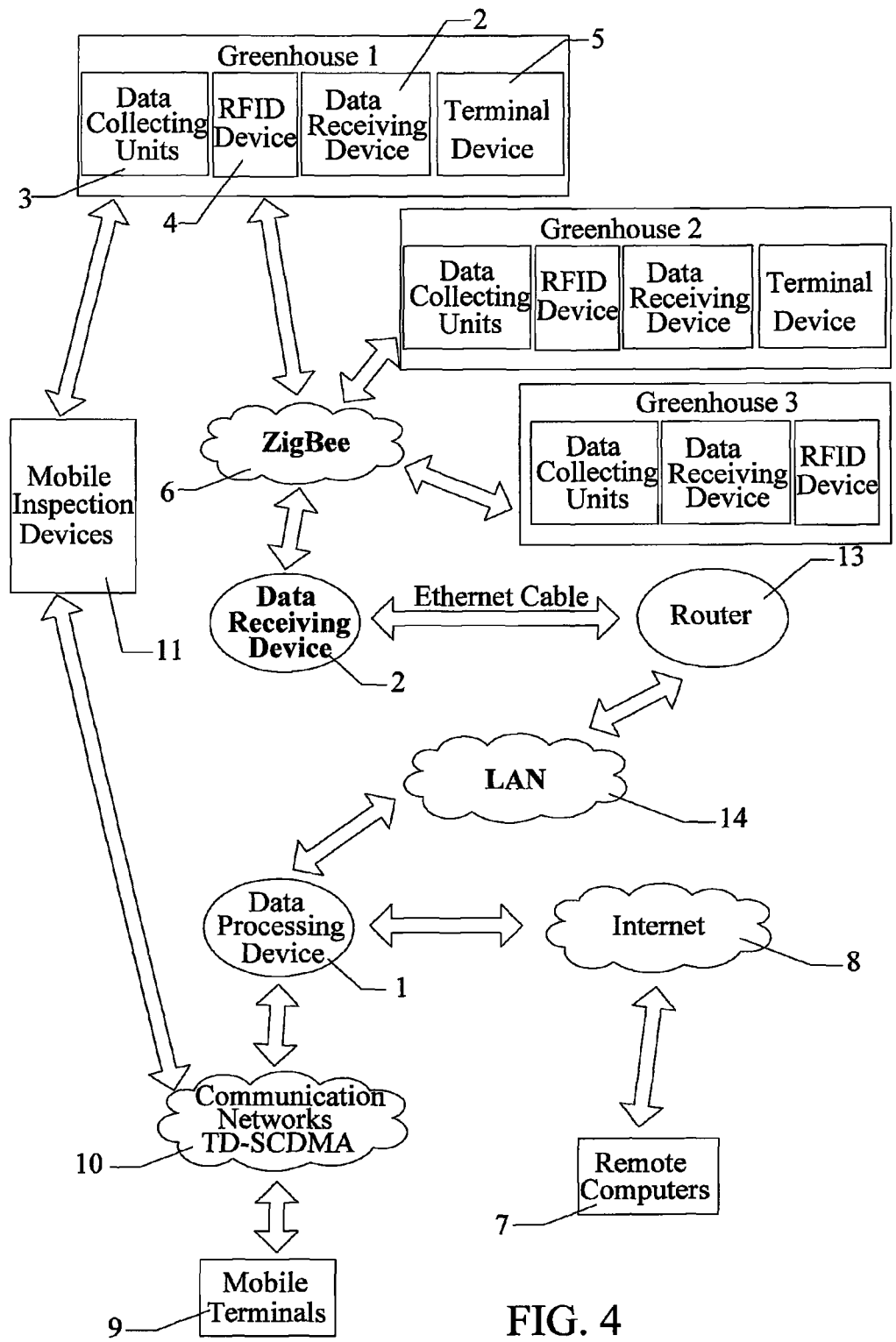
FIG. 4 illustrates the overall architecture of the internet of things based monitor and alarm management system in embodiment two.

In FIG. 4, the internet of things based farm greenhouse monitor and alarm management system includes the data processing device 1, the data receiving device 2, the data collecting units 3, the RFID device 4, the terminal device 5, the ZigBee network 6, the remote computer 7, the Internet 8, the mobile terminal 9, the communication network 10, the mobile inspection devices 11, the router 13 and the local area network 14. The data collecting units 3 collect environmental parameters in real-time and send them to data receiving devices 2 through ZigBee networks 6. The data receiving device 2 regularly transfers the environmental parameters obtained to the data processing device 1, which, having received the data stores it into databases and judges whether to send an alarm according to alarm conditions set in advance. The data receiving device 2 is connected to the router 13 over the Ethernet, and the local area network 14 is built between router 13 and the data processing device 1. Transmitting data between the data receiving device 2 and the data processing device 1 is achieved by router 13 and the local area network 14. The data processing device 1 is connected to Internet 8, and provides a user interface, through which the remote computers 7 monitor the crop living environmental factors in the greenhouse or manage the system over the Internet 8. The mobile terminal 9 can access the user interface provided by the data processing device 1 over communication network TD-SCDMA 10 and can monitor the growth of crops inside greenhouses or can manage the system in real-time. The mobile inspection device 11 can read electronic tags on the RFID device 4 to identify a unique greenhouse and can connect to data processing devices 1 over the communication network TD-SCDMA 10 and will query information about the greenhouse and broadcast it to practitioners in the form of voice. The terminal device 5 placed inside a larger greenhouse can process the data of environmental parameters transferred by the data receiving device 2 and can judge whether the current environment is suitable for crops' growth, and if not, it will play a piece of music as an alarm, which is convenient for practitioners to keep abreast of the greenhouse environment parameters in real time.

In this embodiment, the deployment of devices inside the greenhouse and functions of the system are the same as the devices in embodiment one, illustrated by FIGS. 2 and 3. In this case, by adding a router device 13 and thus building a local area network 14 make up for the deficiency of ZigBee network 6 that is only suitable for short-distance and obstaclefree communication, which makes it possible to place data processing devices in a distant and special control cabinet. The system therefore has less constraints and is more flexible, easy to deploy, maintain and manage.

Embodiment Three

In embodiments one and two, the data processing devices 1 need to connect to the Internet 8 to provide the service of data access, so that any other devices which connect to Internet 8 can access the service. If so, a domain name is needed, and it will add to the cost. For some greenhouses, it may not be necessary to make the service of data access available on the Internet 8, and those computers inside and mobile inspection devices 11 having the ability to access the data processing devices 1 are enough. In this case, the Internet 8 can be replaced by the local area networks 14. Meanwhile, the data processing devices 1 need to access the Internet 8, because the data processing device 1 will alarm users in the form of fetion that needs the Internet 8. Other computers in the local area network 14 can access the data processing devices 1 by their IP addresses. Mobile phones or other mobile devices connect to the system by local wireless networks.

Figure 5:
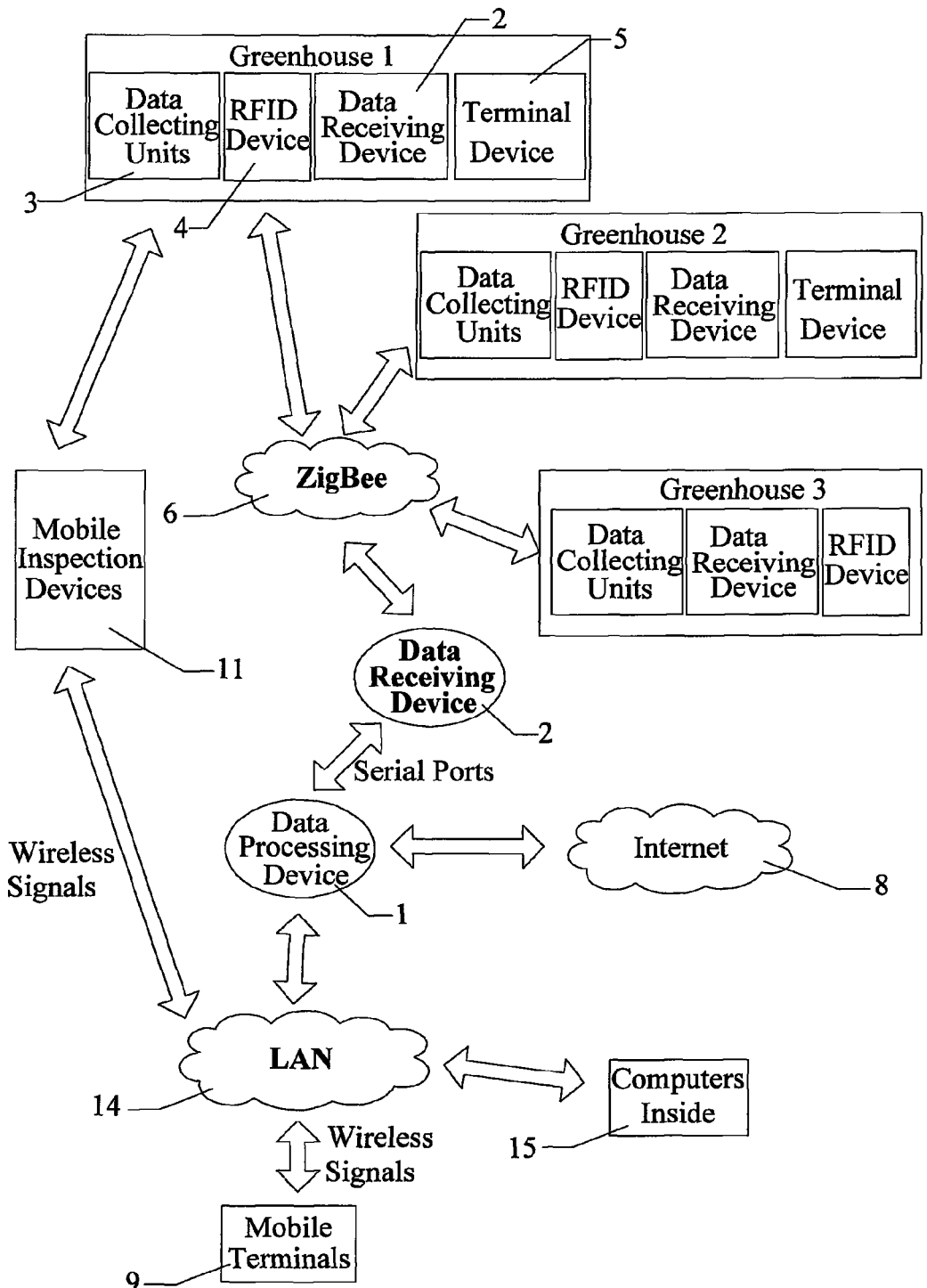
FIG. 5 illustrates the overall architecture of the internet of things based monitor and alarm management system in embodiment three.

The overall architecture of the system is as FIG. 5 illustrates, which includes the data processing devices 1, the data receiving devices 2, the data collecting units 3, the RFID devices 4, the terminal devices 5, the ZigBee network 6, the Internet 8, the mobile terminals 9, the mobile inspection devices 11, the local area network 14, and inside computers 15. The data collecting units 3 collect environmental parameters in real-time and send them to data receiving devices 2 through the ZigBee networks 6. The data receiving device 2 regularly transfers the environmental parameters obtained to the data processing device 1, which, having received the data, stores it into databases and judges whether to send an alarm according to alarm conditions set in advance. Serial or USB ports are utilized to connect the data receiving device 2 and the data processing device 1. The data processing device 1 is connected to the local area network 14 and provides a user interface, through which the inside computers 15 can monitor the growth of crops inside greenhouses or manage the system in real-time over the local area network 14. The mobile terminal 9 can access the user interface provided by the data processing device 1 by connecting to the local area network 14 using wireless signals and can monitor the growth of crops inside greenhouses or can manage the system in real-time. The mobile inspection device 11 can read electronic tags on the RFID device 4 to identify a unique greenhouse and can connect to data processing devices 1 over the local area network 14 and will query information about the greenhouse and broadcast it to practitioners in the form of voice. The terminal device 5 placed inside a larger greenhouse can process the data of environmental parameters transferred by the data receiving device 2 and can judge whether the current environment is suitable for crops' growth, and if not, it will play a piece of music as an alarm, which is convenient for practitioners to keep abreast of the greenhouse environment parameters in real time. In this embodiment, the deployment of devices inside the greenhouse and functions of the system are the same as the devices in embodiment one, illustrated by FIGS. 2 and 3. This embodiment is suitable for smaller greenhouses or those of low cost.

Embodiment Four

Figure 6:
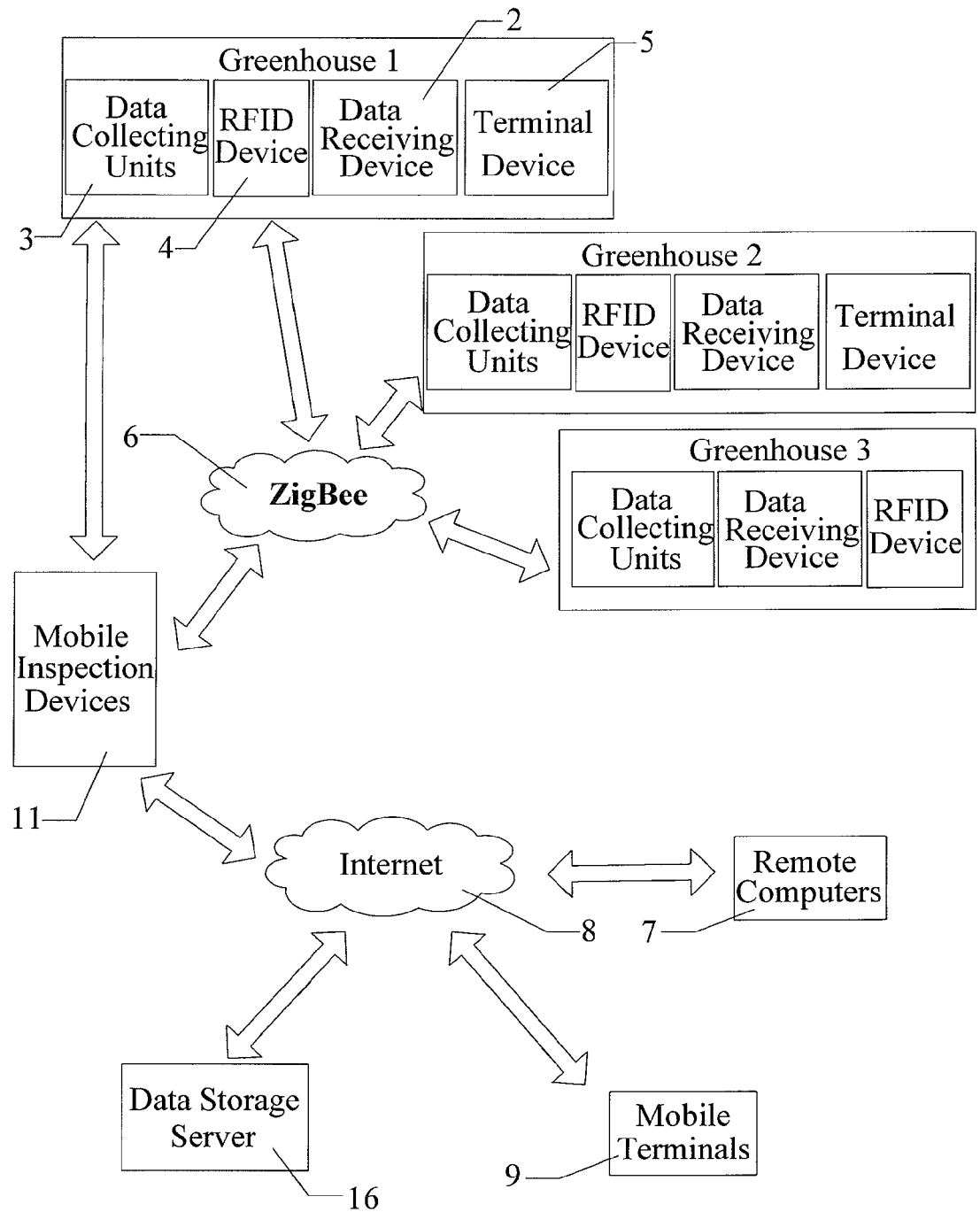
FIG. 6 illustrates the overall architecture of the internet of things based monitor and alarm management system in embodiment four.

The overall architecture of the embodiment four is as FIG. 6 illustrates, in which the system includes the data processing devices 1, the data receiving devices 2, the data collecting units 3, the RFID devices 4, the terminal devices 5, the ZigBee network 6, the Internet 8, the mobile terminals 9, the mobile inspection devices 11, the local area network 14, and the inside computers 15. The data collecting units 3 collect environmental parameters in real-time and send them to data receiving devices 2 through ZigBee networks 6. The mobile inspection device 11, mounted on vehicles or tracks, in accordance with the planned route, inspects all greenhouses, and it can read the RFID tag device 4 placed in the greenhouse to identify a unique nearest greenhouse, and then sends requests to data receiving devices 2 asking for data. The data receiving device 2 transmits environmental parameters received to the mobile inspection device 11 via the ZigBee network 6. The mobile inspection device 11 stores the data obtained and analyzes it to judge whether an alarm condition is met, and if so, the mobile inspection device 11 will alarm users in a pre-set way. The mobile inspection device 11 connects to the Internet 8. All of the data can be uploaded to the data storage server 16, which provides a user access interface for the remote computers 7 and the mobile terminals 9 to log in and access the server via the Internet 8, and to monitor the growth of greenhouse crops, or to manage the system. The terminal device 5 placed inside a larger greenhouse can process the data of the environmental parameters received from the device 2 to judge whether the current environment is suitable for crops, and if not, it will play a piece of music as an alarm, which facilitates on-site practitioners to keep abreast of the greenhouse environment parameters in real time. In this embodiment, the deployment of devices inside the greenhouse and functions of the system are the same as the devices in embodiment one, illustrated by FIGS. 2 and 3.

Figure 7:
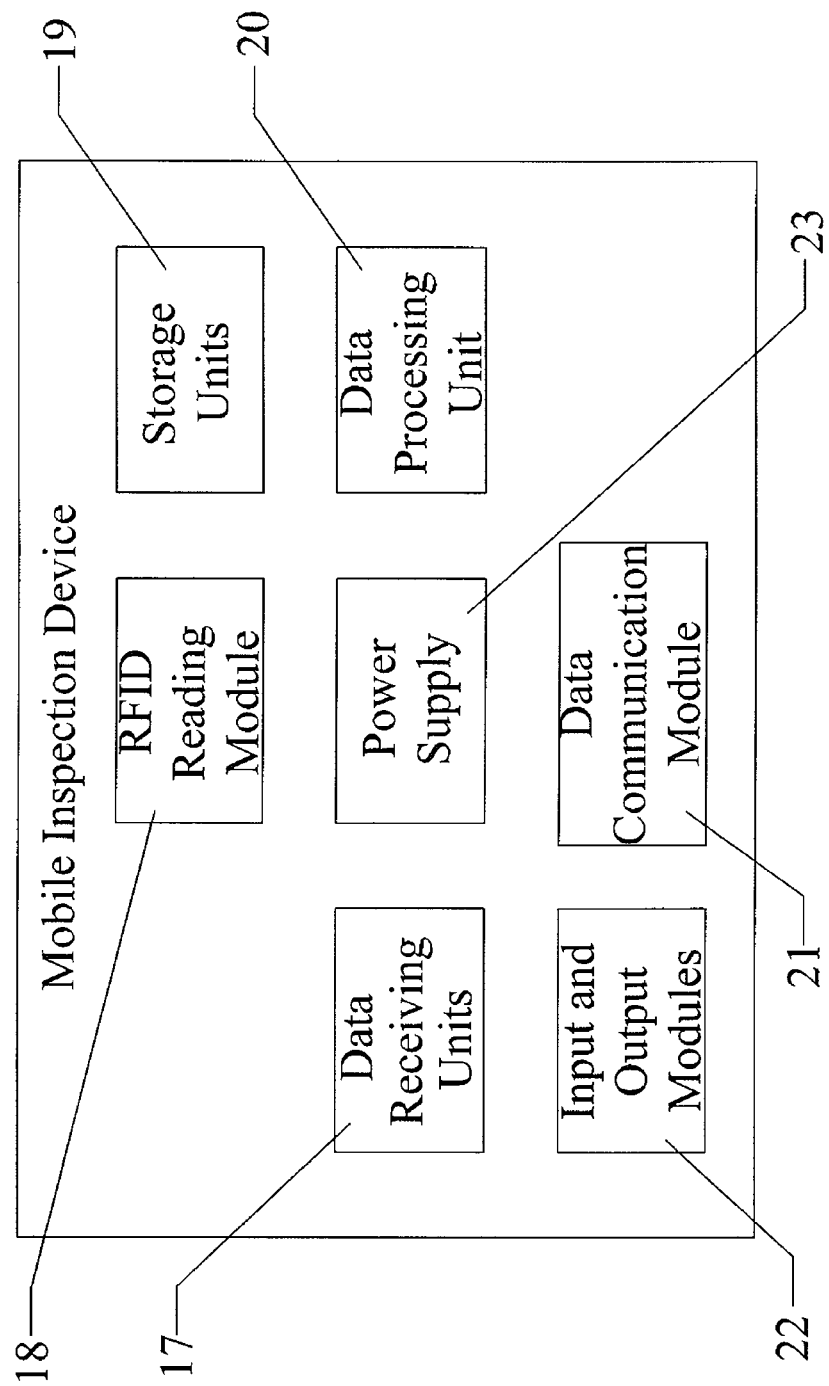
FIG. 7 illustrates the internal structure of mobile inspection devices of the system.

The internal structure of the mobile inspection device 11 is shown in FIG. 7, which includes data receiving units 17, RFID reading module 18, storage units 19, data processing unit 20, data communication module 21, input and output modules 22 and the power supply 23. The RFID reading module 18 automatically reads electronic tags on the RFID device 4 inside the nearest greenhouse alongside its inspecting route to identify a unique greenhouse. Then, the data receiving units 17 send requests to the data receiving devices 2, which transmits environmental parameters to the data processing units 20. Further, the data processing units 20 store the data obtained and analyze it to judge whether an alarm condition is met, and if so, it will alarm users in a pre-set way. Also, the data processing units 20 will periodically through the data communication module 21 upload all the data to the data storage server 16 via the Internet 8. Users can, through the input and output modules 22, configure the system or view related information. The whole inspection device 11 is powered by the power supply.

Of course, the mobile inspection devices 11 of the invention in other embodiments can also have those functions in this embodiment in order to expand flexibly the applied range of the system, and, if the fixed network in other embodiments fails, the mobile inspection device 11 in this case can be used as backups and supplementary units of the part of contacting and processing of the entire system.

Embodiment Five

Figure 8:
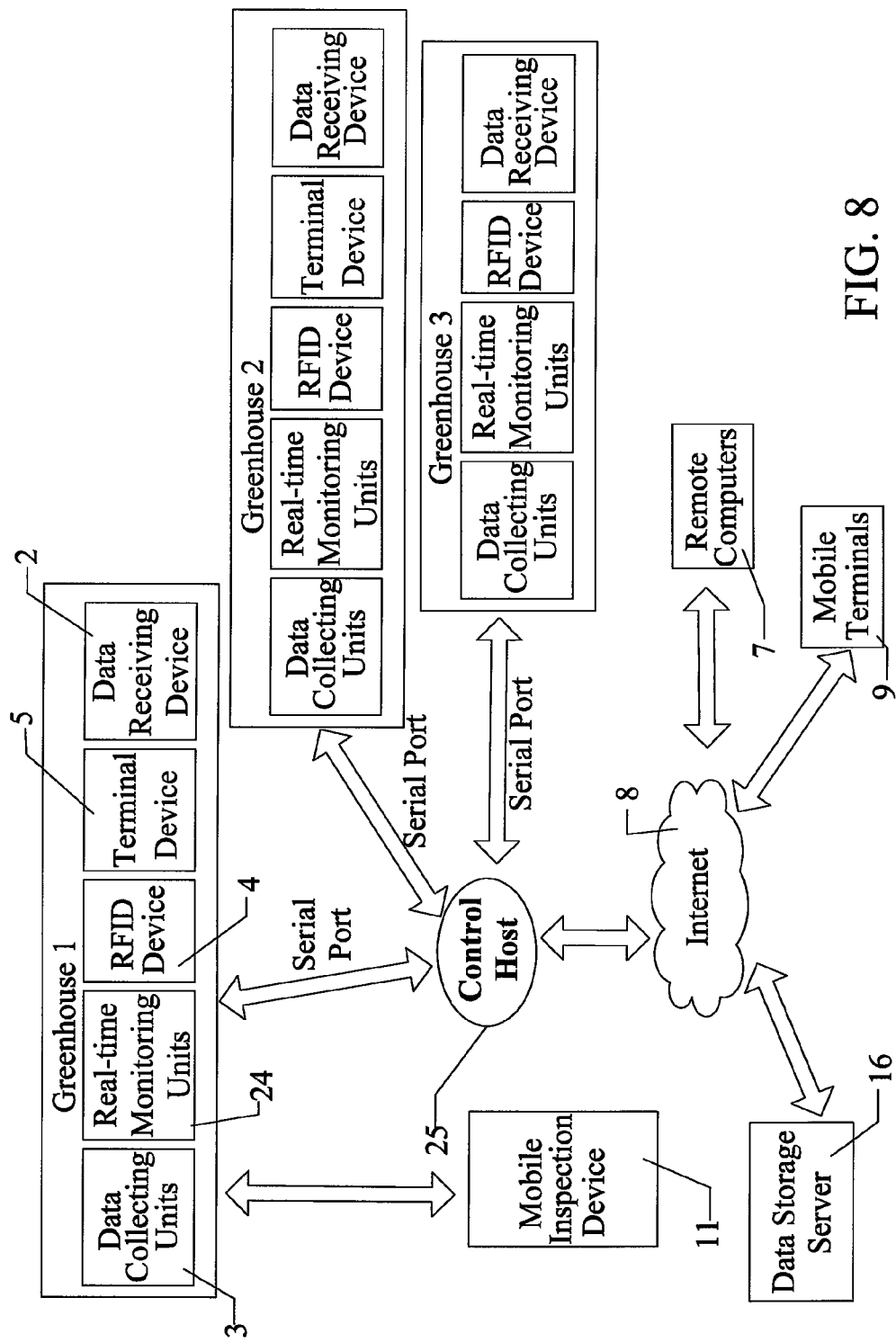
FIG. 8 illustrates the overall architecture of the internet of things based monitor and alarm management system in embodiment four.

The overall architecture of the embodiment five is as FIG. 8 illustrates, in which the system includes the data receiving devices 2, the data collecting units 3, the RFID devices 4, the terminal devices 5, the remote computers 7, the Internet 8, the mobile terminals 9, the mobile inspection devices 11, the data storage server 16, real-time monitoring units 24, and control the host 25. The data collecting units 3 in real-time collect environmental parameters (such as air temperature, air humidity, illumination, soil temperature, soil moisture, etc.) and transfer the data via data lines to the real-time monitoring unit 24, which is a timing chip and responsible for monitoring environment parameters in real time and for analyzing the data to judge whether alarm conditions are met, and, in which case, it will, through the serial cable, send boot alarm signals to the control host 25, which is normally turned off, and after receiving the alarm boot signals from the real-time monitoring unit 24, the control host 25 starts the host system and displays alarm information in accordance with the user-defined configuration. The real-time monitoring unit 24 connects to the control host 25 through the serial port or to the USB port, which can be connected to the Internet 8 and periodically upload a variety of data up to the data storage server 16. The remote computers 7 or the mobile terminals 9 log in at anytime to the data storage server 16 via the Internet 8, and, by the user interface, monitor the growth of crops or manage the system. The mobile inspection device 11 can read electronic tags on the RFID device 4 to identify a unique greenhouse and send requests asking for environmental parameters to the data receiving device 2 inside. Having received the data, the mobile inspection device 11 broadcasts it to practitioners in the form of voice. The terminal device 5 placed inside a larger greenhouse and connected to real-time monitoring units 24 is normally turned off and will start up the system and display alarm information once it receives boot signals sent by the real-time monitoring units 24. Then, it will play a piece of music as an alarm, which is convenient for practitioners to keep abreast of the greenhouse environment parameters in real time.

Figure 9:
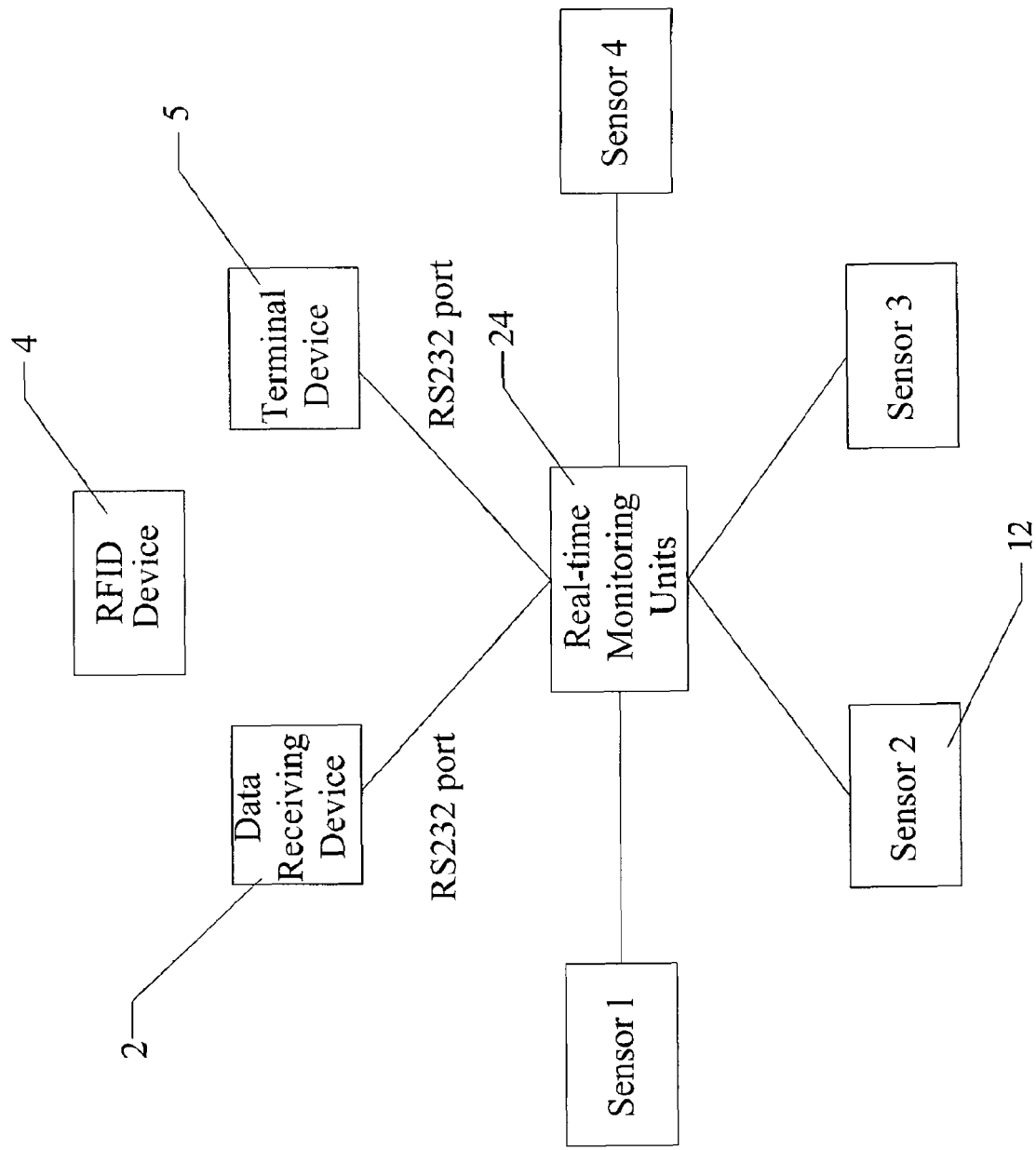
FIG. 9 illustrates the structure of the devices inside greenhouses in embodiment five.

FIG. 9 illustrates the structure of devices inside greenhouses, with those devices including the data receiving device 2, the RFID device 4, the terminal device 5, the sensors 12, and the real-time monitoring units 24. Multiple sensors 12 constitute a data collecting unit, which collects environmental parameters (air temperature and humidity, illumination, soil temperature and moisture, etc.) in real time and sends them via serial cables to the real-time monitoring unit 24, which is a timing chip and responsible for monitoring environment parameters in real time. The real-time monitoring unit 24 will analyze the data to judge whether alarm conditions are met, and in which case, it will through the serial cable send boot alarm signals to the control host 25, and it also connects to the terminal devices 5 via the RS232 port. The terminal device 5 is normally turned off until it receives boot signals coming from the real-time monitoring units 24, and it will start up and play a piece of music as an alarm. The RFID device 4 uniquely identifies a greenhouse and the information it saves can be read by practitioners' mobile inspection devices.

The system functional diagram in this embodiment is the same as embodiment one as figure three illustrates.

This embodiment is characterized by its low-power, because the control hosts of the entire system and all the terminal devices 5 are normally turned off. Each greenhouse has a real-time monitoring unit 24, which is a timing chip and responsible for real-time monitoring environmental parameters. As is known, the energy consumption of the microcontroller compared to the PCs or servers is quite different, to effectively reduce the energy consumption of the entire system.

The invention has the following advantages:

Firstly, it will automatically collect environmental parameters such as air temperature and humidity, illumination, soil temperature, soil moisture, etc. and will judge the critical value of the parameters and alarm, with the characteristics of high intelligence.

Secondly, the system utilizes ZigBee chip integrated wireless sensors and data collecting modules, making it low-power and low-cost.

Thirdly, in this system, the sensors and data receiving devices transmit data using wireless transmission, so it is easy to move, simple to deploy, easy to extend, and space saving.

Fourthly, using this system, especially the mobile inspection devices provided by the system, greatly reduces the requirements for practitioners, as long as they follow the voice instructions. With requirements for practitioners being lowered, the cost of automated management of greenhouses lowers.

The above embodiments have expatiated various implementation forms of parts of this invention. However, the specific implementation form of this invention is not limited thereto. For those general technical personnel in technical fields, in the case without departure from the spirit and scope of the claims, any obvious change in this invention is within the scope of protection.

What is claimed is:

1. A farm greenhouse monitor and alarm management system based on an Internet of things comprising:
    a data collecting unit including air temperature and humidity sensors, illumination sensors and soil parameters sensors placed in greenhouses and collecting data of environmental parameters;
    a mobile inspection device including data receiving units, tag reading modules, storage units, data processing units, data communicating modules, I/O modules, and a power supply, with the mobile inspection device reading an electronic tag attached to tag devices in the greenhouses to identify a unique greenhouse and get the data of environmental parameters through wireless networks, with the data of environmental parameters saved to judge whether to alarm and alarming once conditions are met, with the mobile inspection device alarming users, with all of the data of environmental parameters in the mobile inspection device uploaded to data storage servers through the Internet to be accessed by the users;
    wherein the data collecting unit transports the data of environmental parameters to data receiving devices through wireless networks;
    wherein the data receiving devices placed in the greenhouses receive or transfer the data of environmental parameters from the data collecting unit through the wireless networks or serial ports;
    wherein the tag devices are placed in the greenhouses and identify the unique greenhouse, with the tag reading modules of the mobile inspection device reading information from the unique greenhouse;
    wherein the data storage servers store the data of environmental parameters and provide the users an interface to access the data of environmental parameters, with the users enabled to monitor the environment in which the crops live or manage the system after logging in through the interface.

2. The farm greenhouse monitor and alarm management system as claimed in claim 1, wherein the mobile inspection device includes the tag reading modules automatically collecting the data from the tag devices in the unique greenhouse alongside an incepting route to identify the unique greenhouse, wherein the data receiving units send requests to the data receiving device in the unique greenhouse asking for the data of environmental parameters and transfers the data of environmental parameters to the data processing units, wherein the storage units save the data of environmental parameters from the data processing units, wherein the data processing units analyze the data of environmental parameters received and judges whether to alarm and alarms the users when alarming conditions are met, wherein the data communicating modules communicate with outside, with the data processing units sending all kinds of information to the data communicating modules regularly and uploading the data of environmental parameters to the data storage servers, wherein the I/O modules get users' input signals to perform operations and to show an interactive graphical interface, wherein the power supply entirely powers the mobile inspection device.

3. The farm greenhouse monitor and alarm management system as claimed in claim 1, further comprising a wireless communication between the data collecting unit and the data receiving devices in the greenhouses.

4. The farm greenhouse monitor and alarm management system as claimed in claim 1 further including a terminal device processing the data of environmental parameters coming from the data receiving devices and judging whether a current environment is suitable for crops and playing a song to alarm when the current environment is suitable for crops 5. The farm greenhouse monitor and alarm management system as claimed in claim 1, wherein the data collecting unit includes distributed soil sensors.

6. A farm greenhouse monitor and alarm management system based on an Internet of things comprising:
    a data collecting unit including air temperature and humidity sensors, illumination sensors and soil parameters sensors placed in the greenhouses collecting data of environmental parameters; and
    fixed devices adapted to be placed in a control room, wherein the fixed devices include data receiving devices, a data processing device, storage units, data communication modules, and I/O modules, wherein the fixed devices process the data of environmental parameters collected from the data receiving devices and judge whether alarm conditions are met according to requirements of crops planted and alarm inspection practitioners when the requirements are met, wherein the data collection unit transports the data of environmental parameters to the data receiving devices through wireless networks, wherein the data of environmental parameters includes data of soil temperature and humidity and air temperature and humidity; wherein the data receiving devices receive or transfer the data of soil temperature and humidity and air temperature and humidity collected from the data collecting unit, with the data of soil temperature and humidity and air temperature and humidity transferred to the data processing device by serial ports, through which the data receiving devices are connected with the data processing device.

7. The farm greenhouse monitor and alarm management system as claimed in claim 6, wherein the fixed devices read tag information from tag devices inside the greenhouses to identify a unique greenhouse and connect to the data processing device through mobile communication networks TD-SCDMA to query greenhouse's information, with the information collected as a form of a voice broadcast provided to the inspection practitioners.

8. The farm greenhouse monitor and alarm management system as claimed in claim 6 further comprising a router, with the router and the data receiving devices connected by Ethernet, with a local area network established by the router, with the data processing device getting the data of environmental parameters through the router.

9. The farm greenhouse monitor and alarm management system as claimed in claim 6, wherein the data receiving devices include a serial port communication therebetween.

10. The farm greenhouse monitor and alarm management system as claimed in claim 6 further including a real-time monitor unit placed inside the greenhouses, wherein the real-time monitor unit is a timing single chip micyoco with responsibilities to monitor the data of environmental parameters in real-time, wherein the real-time monitor unit gets the data of environmental parameters from the data collecting unit and judges whether alarm conditions are met and sends boot alarm signals to the data processing device in a form of a control host through serial cables when the alarm conditions are met, wherein the control host is normally turned off and turned on to boot the control host to show alarm messages and alarm the inspection practitioners in a pre-set way when the boot alarm signals from the real-time-monitor unit arrives, wherein the control host and the real-time-monitor unit are connected by serial ports or to a USB port.

\* \* \* \* \*